(12) United States Patent
Oh et al.

(10) Patent No.: US 10,295,874 B2
(45) Date of Patent: May 21, 2019

(54) DISPLAY DEVICE AND METHOD OF MANUFACTURING THE DISPLAY DEVICE

(71) Applicant: Samsung Display Co., Ltd., Yongin-si, Gyeonggi-do (KR)

(72) Inventors: Dong Gun Oh, Osan-si (KR); Sung Hoon Lim, Suwon-si (KR); Do Hyun Jung, Cheonan-si (KR); Jean Ho Song, Yongin-si (KR); Hyeon Jun Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 121 days.

(21) Appl. No.: 15/395,503

(22) Filed: Dec. 30, 2016

(65) Prior Publication Data

US 2017/0192329 A1   Jul. 6, 2017

(30) Foreign Application Priority Data

Dec. 30, 2015   (KR) ......................... 10-2015-0190230

(51) Int. Cl.
*G02F 1/1362* (2006.01)
*G02F 1/1333* (2006.01)
*G02F 1/1343* (2006.01)
*G02F 1/1368* (2006.01)
*G02F 1/1345* (2006.01)

(52) U.S. Cl.
CPC ...... *G02F 1/136286* (2013.01); *G02F 1/1368* (2013.01); *G02F 1/13454* (2013.01); *G02F 1/133345* (2013.01); *G02F 1/134309* (2013.01); *G02F 1/136227* (2013.01); *G02F 2001/13456* (2013.01); *G02F 2001/13629* (2013.01); *G02F 2001/136272* (2013.01); *G02F 2201/121* (2013.01); *G02F 2201/123* (2013.01); *G02F 2202/02* (2013.01)

(58) Field of Classification Search
CPC ......... G02F 1/136286; G02F 1/136227; G02F 2001/13456; G02F 1/133345; G02F 2001/136272
See application file for complete search history.

(56) References Cited

U.S. PATENT DOCUMENTS

2003/0030381 A1*  2/2003  Yamazaki ........... G02F 1/13454
                                                          315/169.1
2012/0127412 A1*  5/2012  Lee ...................... G02F 1/1345
                                                          349/139

(Continued)

FOREIGN PATENT DOCUMENTS

KR   10-2015-0021408 A   3/2015
KR   10-2015-0072509 A   6/2015
KR   10-2015-0078593 A   7/2015

*Primary Examiner* — Jia X Pan
(74) *Attorney, Agent, or Firm* — Innovation Counsel LLP

(57) ABSTRACT

A display device may include a switching device, a gate line, a data line, a pixel electrode, and an auxiliary line. The switching device includes a first electrode, a second electrode, and a third electrode. The gate line is electrically connected to the first electrode. The data line crosses the gate line in a plan view of the display device and is electrically connected to the second electrode. The pixel electrode is electrically connected to the third electrode. The auxiliary line is electrically connected through the first gate line to the first electrode and crosses the gate line in the plan view of the display device.

18 Claims, 13 Drawing Sheets

(56) References Cited

U.S. PATENT DOCUMENTS

| | | | | |
|---|---|---|---|---|
| 2013/0113766 A1* | 5/2013 | Kim | ..................... | G09G 3/3648 |
| | | | | 345/205 |
| 2014/0043306 A1* | 2/2014 | Min | ..................... | G09G 3/3685 |
| | | | | 345/204 |
| 2014/0319527 A1* | 10/2014 | Shin | ..................... | H01L 27/124 |
| | | | | 257/59 |
| 2015/0123114 A1* | 5/2015 | Lim | ..................... | H01L 27/124 |
| | | | | 257/43 |
| 2016/0098144 A1* | 4/2016 | Yang | ..................... | G06F 3/0416 |
| | | | | 345/174 |
| 2017/0307950 A1* | 10/2017 | Bennett | ............. | G02F 1/136286 |

* cited by examiner

DISPLAY DEVICE AND METHOD OF MANUFACTURING THE DISPLAY DEVICE

This application claims priority to Korean Patent Application No. 10-2015-0190230 filed on Dec. 30, 2015 in the Korean Intellectual Property Office; the disclosure of the Korean Patent Application is incorporated herein by reference in its entirety.

BACKGROUND

1. Field

The technical field relates to a display device, such as a liquid crystal display (LCD) device, and a method of manufacturing the display device.

2. Description of the Related Art

A display device, such as a liquid crystal display (LCD) device, may include field-generating electrodes and a liquid crystal layer. The LCD device may generate an electric field in the liquid crystal layer by applying a voltage to the field-generating electrodes so as to determine orientations of liquid crystal molecules in the liquid crystal layer for controlling transmission of light incident, thereby displaying an image.

In the LCD device, a gate driver connected to a plurality of gate lines and a data driver connected to a plurality of data lines may be disposed on different sides of a display panel. Significant space is needed to accommodate each of the gate driver and the data driver.

SUMMARY

An embodiment may be related to a liquid crystal display (LCD) device. The LCD device may include the following elements: a substrate, a first gate line disposed on the substrate, a data line disposed on the first gate line and insulated from the first gate line, an auxiliary line extending over the data line in the same direction as the data line and overlapping the data line, a first switching device including a first electrode, which is connected to the first gate line, a second electrode, which is connected to the data line, and a third electrode, which is disposed on the same layer as the data line and is spaced from the second electrode and a first pixel electrode, which is connected to the third electrode of the first switching device. The auxiliary line may be disposed on the same layer as the first pixel electrode and is connected to the first gate line.

An embodiment may be related to an LCD device. The LCD device may include the following elements: a display panel, an integrated driver disposed on one side of the display panel and connected to a data line, which extends in a first direction, and an auxiliary line, which overlaps the data line and a first gate line extending in a second direction, which is different from the first direction, and connected to the auxiliary line. The display panel may include a first pixel unit, which includes a first switching device connected to the first gate line and the data line and a first pixel electrode connected to the first switching device, and the auxiliary line is disposed on the same layer as the first pixel electrode.

An embodiment may be related to a method of manufacturing an LCD device. The method may include the following steps: preparing a substrate having a gate line covered by a gate insulating layer, forming a data line on the gate insulating layer, forming a first inorganic insulating layer on the data line, forming an organic insulating layer on the first inorganic insulating layer, forming a common electrode on the organic insulating layer, forming a second inorganic insulating layer on the common electrode, forming a second passivation layer, a first passivation layer, and a gate insulating layer, which partially expose the gate line, by etching the second inorganic insulating layer, the first inorganic insulating layer, and the gate insulating layer, and forming an auxiliary line, which is connected to at least part of the partially-exposed gate line, on the second passivation layer. The auxiliary line may overlap the data line.

An embodiment may be related to a display device. The display device may include a first switching device, a first gate line, a first data line, a first pixel electrode, and a first auxiliary line. The first switching device includes a first electrode, a second electrode, and a third electrode, which may be a gate electrode, a source electrode, and a drain electrode, respectively. The first gate line may be electrically connected to the first electrode. The first data line may cross the first gate line in a plan view of the display device and may be electrically connected to the second electrode. The first pixel electrode may be electrically connected to the third electrode. The first auxiliary line may be electrically connected through the first gate line to the first electrode and may cross the first gate line in the plan view of the display device.

The first auxiliary line may extend parallel to the first data line. The features can be appreciated with reference to, for example, FIG. 2, FIG. 3, FIG. 4, and related description.

The display device may include a first insulating layer, which may directly contact each of the first pixel electrode and the first auxiliary line. A first flat side of the first insulating layer may directly contact each of the first pixel electrode and the first auxiliary line. A material of the first pixel electrode may be identical to a material of the first auxiliary line. The first insulating layer may be positioned between the first data line and the first auxiliary line. The first auxiliary line may overlap the first data line and may be positioned over the first data line in a direction perpendicular to the first flat side of the first insulating layer. The display device may include a common electrode, which may directly contact a second side of the first insulating layer and may overlap each of the first pixel electrode and the first auxiliary line. The display device may include a liquid crystal layer. The first auxiliary line may be positioned between the liquid crystal layer and the first insulating layer. Both the first insulating layer and the first auxiliary line may be positioned between the common electrode and the liquid crystal layer. The features can be appreciated with reference to, for example, FIG. 5, FIG. 6, and related description.

The display device may include a second switching device, a second data line, and an organic insulating layer. The second data line may extend parallel to the first data line and may be electrically connected to the second switching device. A portion of the first auxiliary line may extend through the first insulating layer, may directly contact the first gate line, and may be positioned between the first data line and the second data line. The organic insulating layer may overlap the first insulating layer. The first insulating layer may be an inorganic insulating layer. The portion of the first auxiliary line may extend through both the first insulating layer and the organic insulating layer. The features can be appreciated with reference to, for example, FIG. 2, FIG. 3, FIG. 7, and related description.

The display device may include a substrate. The first gate line may be positioned closer to the substrate than the first data line. The first data line may be positioned closer to the substrate than the first auxiliary line. The features can be appreciated with reference to, for example, FIG. 5, FIG. 6, and related description.

The display device may include a substrate. The first data line may be positioned between the substrate and the first auxiliary line. The first auxiliary line may be positioned over the first data line in a direction perpendicular to a flat side of the substrate. The features can be appreciated with reference to, for example, FIG. 4, FIG. 5, FIG. 6, and related description.

The display device may include a second switching device, a second pixel electrode, and a second gate line. The second switching device may be electrically connected to the first data line. The second pixel electrode may be electrically connected to the second switching device and may immediately neighbor the first pixel electrode with no pixel electrode being positioned between the first pixel electrode and the second pixel electrode. The second gate line may extend parallel to the first gate line, may cross the first auxiliary line in the plan view of the display device, may be electrically connected to the second switching device, and may be electrically insulated from the first auxiliary line. The features can be appreciated with reference to, for example, FIG. 2, FIG. 3, and related description. For example, the first auxiliary line may be the auxiliary line AL2, the first pixel electrode may be the pixel electrode PE1, the first gate line may be the gate line GL3, the second pixel electrode may be the pixel electrode PE3 or the pixel electrode PE4, and the second gate line may be the gate line GL2 or the gate line GL5. As another example, the first auxiliary line may be the auxiliary line AL1, the first gate line may be the gate line GL2, and the second gate line may be the gate line GL3 or the gate line GL4.

Each of the first data line and the first auxiliary line may be positioned between the first pixel electrode and the second pixel electrode in the plan view of the display device. The features can be appreciated with reference to, for example, FIG. 2, FIG. 3, and related description.

The display device may include a third switching device, a third pixel electrode, and a third gate line. The third switching device may be electrically connected to the first data line. The third pixel electrode may be electrically connected to the third switching device and may immediately neighbor the first pixel electrode without any pixel electrode being positioned between the first pixel electrode and the third pixel electrode. The third gate line may extend parallel to the first gate line, may cross the first auxiliary line in the plan view of the display device, and may be electrically insulated from the first auxiliary line. The first gate line may be positioned between the second gate line and the third gate line. The second gate line may be positioned between the first gate line and the third gate line. The features can be appreciated with reference to, for example, FIG. 2, FIG. 3, and related description.

The display device may include a fourth switching device, a fourth pixel electrode, and a fourth gate line. The fourth switching device may be electrically connected to the first data line and may be positioned farther from the first switching device than the third switching device. The fourth pixel electrode may be electrically connected to the fourth switching device and may immediately neighbor the third pixel electrode with no pixel electrode being positioned between the third pixel electrode and the fourth pixel electrode. The fourth gate line may extend parallel to the first gate line and may cross the first auxiliary line in the plan view of the display device. The first auxiliary line may be electrically connected through the fourth gate line to the fourth switching device. The first gate line and the third gate line may be positioned between the second gate line and the fourth gate line. The second gate line and the third gate line may be positioned between the first gate line and the fourth gate line. The features can be appreciated with reference to, for example, FIG. 2, FIG. 3, and related description.

The display device may include a third switching device, a third pixel electrode, and a third gate line. The third switching device may be electrically connected to the first data line and may be positioned farther from the first switching device than the second switching device. The third pixel electrode may be electrically connected to the third switching device. The third gate line may extend parallel to the first gate line and may cross the first auxiliary line in the plan view of the display device. The first auxiliary line may be electrically connected through the third gate line to the third switching device. The features can be appreciated with reference to, for example, FIG. 2, FIG. 3, and related description.

The display device may include a plurality of drivers. The drivers may be aligned with one another in a direction perpendicular to the auxiliary line and may include a first driver. The first driver may be electrically connected through the first auxiliary line and the first gate line to the first electrode, may be electrically connected through the first data line to the second electrode, may provide a gate signal to the first auxiliary line, and may provide a data signal to the first data line. The features can be appreciated with reference to, for example, FIG. 1, FIG. 2, FIG. 3, and related description.

An embodiment may be related to a method for manufacturing a display device. The method may include the following steps: providing a first switching device, which includes a first electrode, a second electrode, and a third electrode; providing a first gate line, which may be electrically connected to the first electrode; providing a first data line, which may cross the first gate line in a plan view of the display device and may be electrically connected to the second electrode; providing a first pixel electrode, which may be electrically connected to the third electrode; and providing a first auxiliary line, which may be electrically connected through the first gate line to the first electrode and may cross the first gate line in the plan view of the display device.

The method may include the following steps: providing a first inorganic insulating layer; providing an organic insulating layer on the first inorganic insulating layer; providing a common electrode on the organic insulating layer such that the organic insulating layer may be positioned between the first inorganic insulating layer and the common electrode; providing a second inorganic insulating layer on the common electrode such that the common electrode may be positioned between the organic insulating layer and the second inorganic insulating layer; etching, using a mask, all of the second inorganic insulating layer, the organic insulating layer, and the first inorganic insulating layer to form a contact hole through all the second inorganic insulating layer, the organic insulating layer, and the first inorganic insulating layer; and forming the first auxiliary line such that a portion of the first auxiliary line may extend through the contact hole and may directly contact the first gate line.

According to embodiments, several sides of a display device may not need to accommodate drivers. Therefore, a size (e.g., a width) of a bezel of the display device may be minimized. Advantageously, an overall size (e.g., an overall width) of the display device may be minimized.

DETAILED DESCRIPTION

Figure 1:
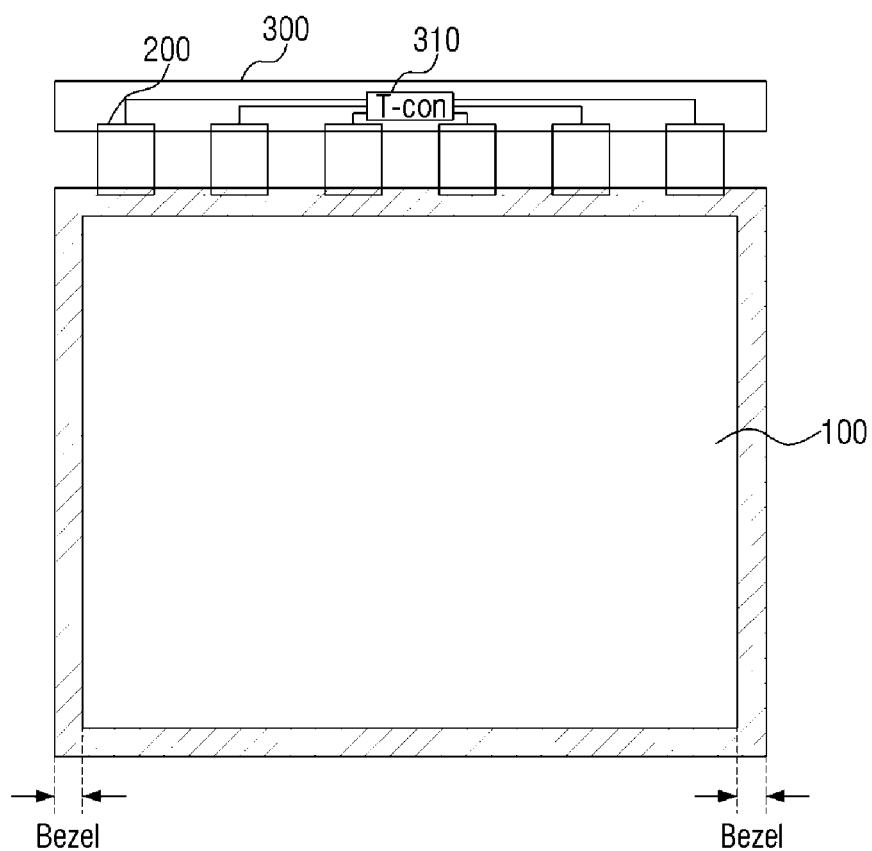
FIG. 1 is a schematic plan view illustrating a display device, such as a liquid crystal display (LCD) device, according to an embodiment.

In the following description, for purposes of illustration, specific details are set forth in order to enable understanding of example embodiments. Various embodiments may be practiced without these specific details or with one or more equivalent or alternative arrangements. Well-known structures and devices may be shown as blocks in one or more block diagrams.

In the accompanying figures, sizes of layers, films, panels, regions, etc., may be exaggerated for clarity and illustrative purposes. Like reference numerals may denote like elements.

In this application, although the terms "first", "second", etc. may be used herein to describe various elements, these elements should not be limited by these terms. These terms may be used to distinguish one element from another element. Thus, a first element discussed in this application may be termed a second element without departing from embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

When a first element is referred to as being "on," "connected to," or "coupled to" a second element, the first element may be directly on, connected to, or coupled to the second element, or one or more intervening elements may be present between the first element and the second element. When a first element is referred to as being "directly on," "directly connected to," or "directly coupled to" a second element, there are no intervening elements (except for environmental elements such as air) intended between the first element and the second element.

As used herein, the term "and/or" includes any and all combinations of one or more of the associated items.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups, but do not preclude the presence or addition of one or more other features, integers, steps, operations, elements, components, and/or groups.

Various embodiments are described herein with reference to sectional illustrations that are schematic illustrations. Variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having meanings that are consistent with their meanings in the context of the relevant art and will not be interpreted in an idealized or overly formal sense, unless expressly so defined herein.

In this application, "connected" may mean "electrically connected"; "insulated" may mean "electrically insulated".

FIG. 1 is a schematic plan view illustrating a display device, such as a liquid crystal display (LCD) device, according to an embodiment.

Referring to FIG. 1, the LCD device may include a display panel 100, integrated drivers 200, and a printed circuit board 300.

The display panel 100 may be a panel for displaying an image. The display panel 100 will be further described with reference to FIG. 2.

Each of the integrated drivers 200 may be a chip that includes a data driver and a gate driver. That is, each of the integrated drivers 200 may include a gate driver, which provides a plurality of gate signals to a plurality of gate lines (e.g., some of gate lines GL1 through GLn illustrated in FIG. 2), and a data driver, which provides a plurality of data signals to a plurality of data lines (e.g., some of data lines DL1 through DLm illustrated FIG. 2). Each of the integrated drivers 200 may include a single integrated circuit (IC) that performs functions of both a gate driver and a data driver.

More specifically, the data driver may include a shift register, a latch, and a digital-to-analog converter (DAC). The data driver may receive control signals and image data from a timing controller 310 ("T-con"), which is disposed on the PCB 300. The data driver may select a reference voltage according to the control signals, and may convert the image data, which is digital waveform data, into a plurality of data signals (D1 through Dm of FIG. 2) according to the selected reference voltage. The data driver may provide the plurality of data signals (D1 through Dm) to the display panel 110.

The gate driver may receive the control signals from the timing controller 310 and may provide a plurality of gate signals to the display panel 100.

That is, the integrated drivers 200 may provide the plurality of data signals (D1 through Dm) and the plurality of gate signals to the display panel 100 according to the control signals provided by the timing controller 310. For example, a plurality of integrated drivers 200 may be provided, as illustrated in FIG. 1, but embodiments are not limited thereto. The integrated drivers 200 may be disposed on one side of the display panel 100.

No particular drivers are disposed on the sides of the display panel 100 except for the side where the integrated drivers 200 are disposed. Accordingly, the size (e.g., the width) of a bezel of the display device may be reduced.

Figure 2:
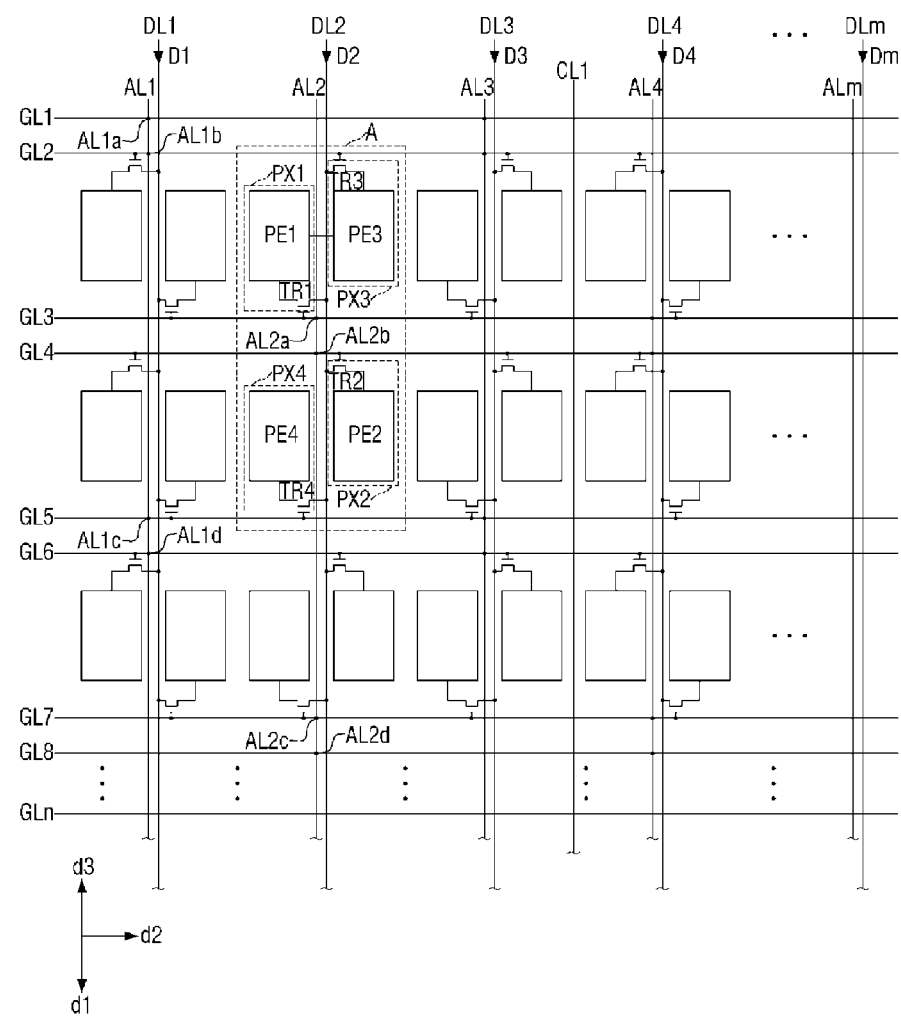
FIG. 2 is a schematic plan view illustrating a display panel of the display device illustrated in FIG. 1 according to an embodiment.

FIG. 2 is a schematic plan view illustrating the display panel 100 of the display device illustrated in FIG. 1 according to an embodiment. The display panel 100 is described using examples of pixels PX1, PX2, PX3, and PX4 in an area A. In the description that follows, if two elements are described as being "adjacent to" or "immediately neighboring" each other, it means that there is no other analogous/identical element between the two elements. For example, when first and second gate lines GL1 and GL2 are adjacent to each other, there is no other gate line between the first and second gate lines GL1 and GL2.

First through m-th data lines DL1 through DLm and first through m-th auxiliary lines AL1 through ALm extend in a first direction d1. First through n-th gate lines GL1 through GLn extend in a second direction d2, which is different from the first direction d1. The first direction d1 and the second direction d2 may cross each other at right angles. The first direction d1 may be a column direction, and the second direction d2 may be a row direction.

The first through m-th data lines DL1 through DLm, the first through m-th auxiliary lines AL1 through ALm, and the first through n-th gate lines GL1 through GLn may be insulated from one another. The first through m-th data lines DL1 through DLm and the first through m-th auxiliary lines AL1 through ALm may be connected to their respective integrated drivers 200 of FIG. 1.

Figure 3:
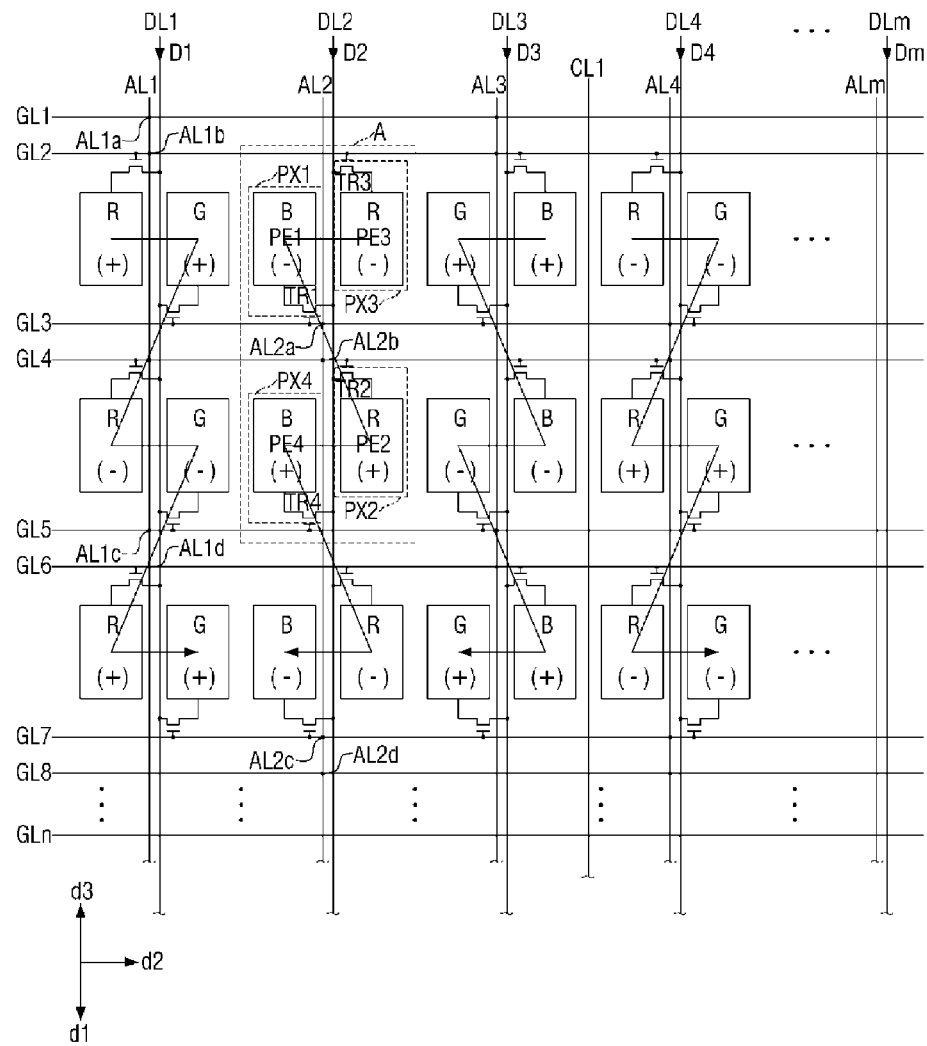
FIG. 3 is a schematic plan view illustrating an operation of the display panel illustrated in FIG. 2 according to an embodiment.

The first through m-th auxiliary lines AL1 through ALm may overlap the first through m-th data lines DL1 through DLm, respectively. For convenience, the first through m-th auxiliary lines AL1 through ALm are illustrated in FIGS. 2 and 3 as being a predetermined distance from the first through m-th data lines DL1 through DLm, respectively. That is, the first through m-th auxiliary lines AL1 through ALm may extend in the first direction d1, overlapping the first through m-th data lines DL1 through DLm, respectively, which also extend in the first direction d1.

The first through m-th auxiliary lines AL1 through ALm may be electrically connected to the first through n-th gate lines GL1 through GLn. For example, the first auxiliary line AL1 may be connected to the first and second gate lines GL1 and GL2 via first and second nodes AL1$a$ and AL1$b$, respectively. The first auxiliary line AL1 may be connected to the fifth and sixth gate lines GL5 and GL6 via third and fourth nodes AL1$c$ and AL1$d$, respectively. However, the first auxiliary line AL1 may not be connected to the third, fourth, seventh, and eighth gate lines GL3, GL4, GL7, and GL8.

The second auxiliary line AL2 may be connected to the gate lines to which the first auxiliary line AL1 is not connected, and the third auxiliary line AL3 may be connected to the same gate lines as the first auxiliary line AL1. The first through n-th gate lines GL1 through GLn may be connected to the first through m-th auxiliary lines AL1 through ALm and may thus receive gate signals from the first through m-th auxiliary lines AL1 through ALm.

The connections between the first through m-th auxiliary lines AL1 through ALm and the first through n-th gate lines GL1 through GLn and a method of the display panel 100 will be described later with reference to FIG. 3.

The display panel 100 may be connected to a plurality of common voltage lines. The plurality of common voltage lines will hereinafter be described, taking a first common voltage line CL1 as an example. The first common voltage line CL1 may extend in the first direction d1 to be in parallel to the first through m-th data lines DL1 through DLm. The first common voltage line Cl1 may be electrically connected to a common electrode CE that will be described later, and may stabilize ripples of a common voltage Vcom. The first common voltage line CL1 may be disposed between the third and fourth data lines DL3 and DL4. Although not specifically illustrated, a second common voltage line may be disposed between the sixth and seventh data lines DL6 and Dl7. That is, each of the plurality of common voltage lines may be disposed for every third data line, between every third and fourth data line, but embodiments are not limited thereto. That is, the number and the arrangement of the plurality of common voltage lines may be changed in consideration of the stabilization of ripples of the common voltage Vcom.

The display panel 100 may include a plurality of pixel units. The arrangement of the plurality of pixel units will hereinafter be described, taking as an example the first through fourth pixel units PX1 through PX4 in the area A.

The first pixel unit PX1 may include a first switching device TR1 and a first pixel electrode PE1.

The first switching device TR1 may be a tri-terminal device such as, for example, a thin-film transistor (TFT). In the description that follows, it is assumed that all switching devices set forth herein, including the first switching device TR1, may be TFTs. The first switching device TR1 may have a gate electrode connected to the third gate line GL3, a source electrode connected to the second data line DL2, and a drain electrode connected to the first pixel electrode PE1. The first switching device TR1 may be turned on by a gate signal provided by the third gate line GL3 and may apply a second data signal D2 provided by the second data line DL2 to the first pixel electrode PE1.

A second switching device TR2 may have a gate electrode connected to the fourth gate line GL4, a source electrode connected to the second data line DL2, and a drain electrode connected to a second pixel electrode PE2. The second switching device TR2 may be turned on by a gate signal provided by the fourth gate line GL4 and may apply the second data signal D2 provided by the second data line DL2 to the second pixel electrode PE2. The second pixel electrode PE2 may be disposed diagonally with respect to the first pixel electrode PE1, as illustrated in FIG. 2.

A third switching device TR3 may have a gate electrode connected to the second gate line GL2, a source electrode connected to the second data line DL2, and a drain electrode connected to a third pixel electrode PE3. The third switching device TR3 may be turned on by a gate signal provided by the second gate line GL2 and may apply the second data signal D2 provided by the second data line DL2 to the third pixel electrode PE3. The first and third pixel electrodes PE1 and PE3 may be symmetrically disposed with respect to the second data line DL2.

A fourth switching device TR4 may have a gate electrode connected to the fifth gate line GL5, a source electrode connected to the second data line DL2, and a drain electrode connected to a fourth pixel electrode PE4. The fourth switching device TR4 may be turned on by a gate signal provided by the fifth gate line GL5 and may apply the second data signal D2 provided by the second data line DL2 to the fourth pixel electrode PE4. The second and fourth pixel electrodes PE2 and PE4 may be symmetrically disposed with respect to the second data line DL2.

That is, the first pixel electrode PE1 may be disposed between the third gate line GL3 and the second gate line GL2, which is adjacent to the third gate line GL3 in a third direction d3. The third and fourth gate lines GL3 and GL4 may be disposed between the first and second pixel electrodes PE1 and PE2.

FIG. 3 is a schematic plan view illustrating an operation of the display panel 100 illustrated in FIG. 2 according to an embodiment. A pair of adjacent data lines may be provided with data signals having different polarities for a given frame. For example, if a data signal having positive polarity (+) is applied to the first data line DL1, a data signal having negative polarity (−) may be applied to the second data line DL2, which is adjacent to the first data line DL1. Each of the first through m-th data signals D1 through Dm may be a signal whose polarity is inverted at intervals of a predetermined period. That is, the polarity of each of the first through m-th data signals D1 through Dm may be converted from the positive polarity (+) to the negative polarity (−) or from the negative polarity (−) to the positive polarity (+) at intervals according to a predetermined period.

As illustrated in FIG. 3, pixel units belonging to the same column may display the same color. Colors that may be displayed by each of the plurality of pixel units include red, green, and blue. Pixel units belonging to the same row may be disposed in the order of red, green, and blue along the second direction d2. The colors that may be displayed by each of the plurality of pixel units and the polarity of each of the first through m-th data signals D1 through Dm are not limited to the example illustrated in FIG. 3, but may vary depending on how the plurality of pixel units are connected to one another.

A driving method of the display panel 100 will hereinafter be described, taking as an example, the first through fourth pixel units PX1 through PX4, which are connected to the second data line DL2.

The first and second gate lines GL1 and GL2 may receive gate signals from the first auxiliary line AL1 via the first and second nodes AL1a and AL1b, respectively. Accordingly, the third switching device TR3, which is connected to the second gate line GL2, may be turned on and may provide a second data signal D2 of the negative polarity (−) provided by the second data line DL2 to the third pixel electrode PE3.

Thereafter, the third and fourth gate lines GL3 and GL4 may receive gate signals from the second auxiliary line AL2 via fifth and sixth nodes AL2a and AL2b, respectively. Accordingly, the first switching device TR1, which is connected to the third gate line GL3, may be turned on and may provide the second data signal D2 of the negative polarity (−) provided by the second data line DL2 to the first pixel electrode PE1.

Thereafter, the second switching device TR2, which is connected to the fourth gate line GL4, may be turned on and may provide a second data signal of the positive polarity (+) provided by the second data line DL2 to the second pixel electrode PE2.

Similarly, the fourth switching device TR4, which is connected to the fifth gate line GL5, may be turned on and may provide the second data signal of the positive polarity (+) provided by the second data line DL2 to the fourth pixel electrode PE4.

That is, pixel units connected to the same data line may receive data signals in a zigzag order as indicated by arrows of FIG. 3. Accordingly, a data signal of the positive polarity (+) and a data signal of the negative polarity (−) may be alternately applied for every two pixel units belonging to the same row. Thus, the positive polarity (+) and the negative polarity (−) may be evenly distributed throughout the plurality of pixel units, thereby preventing deterioration of the display quality of the display panel 100.

Figure 4:
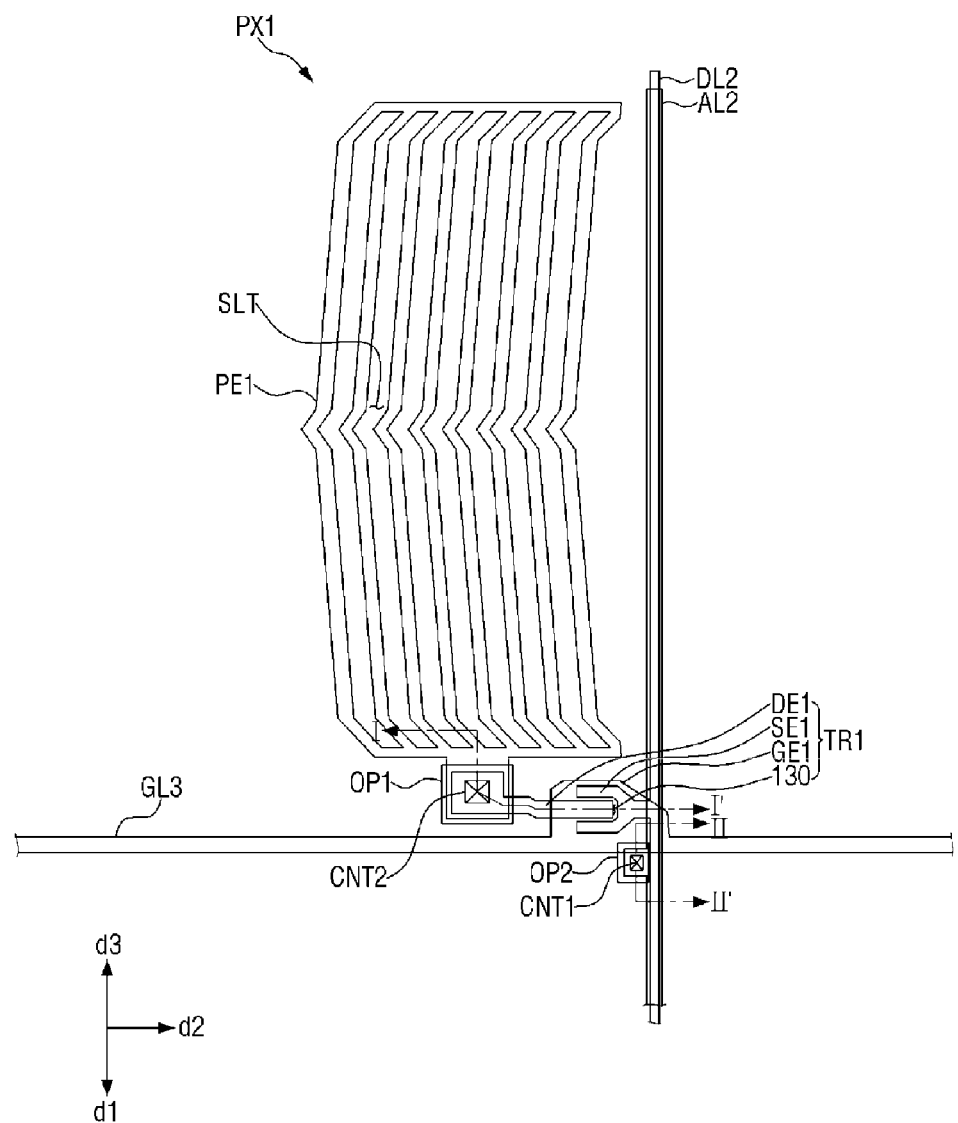
FIG. 4 is a schematic plan view illustrating a first pixel unit of the display panel illustrated in FIG. 2 according to an embodiment.
Figure 5:
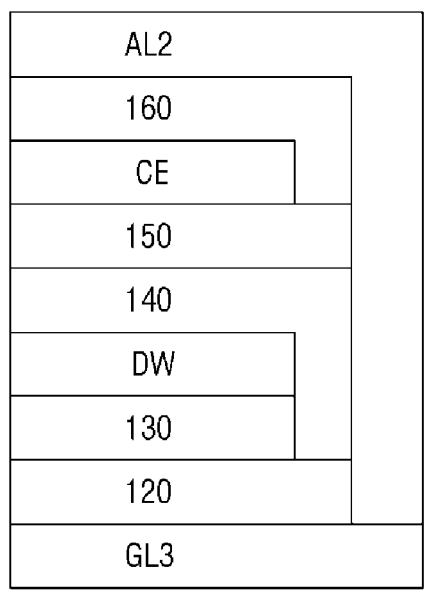
FIG. 5 is a schematic view illustrating a cross-section of the first pixel unit illustrated in FIG. 4 according to an embodiment.
Figure 6:
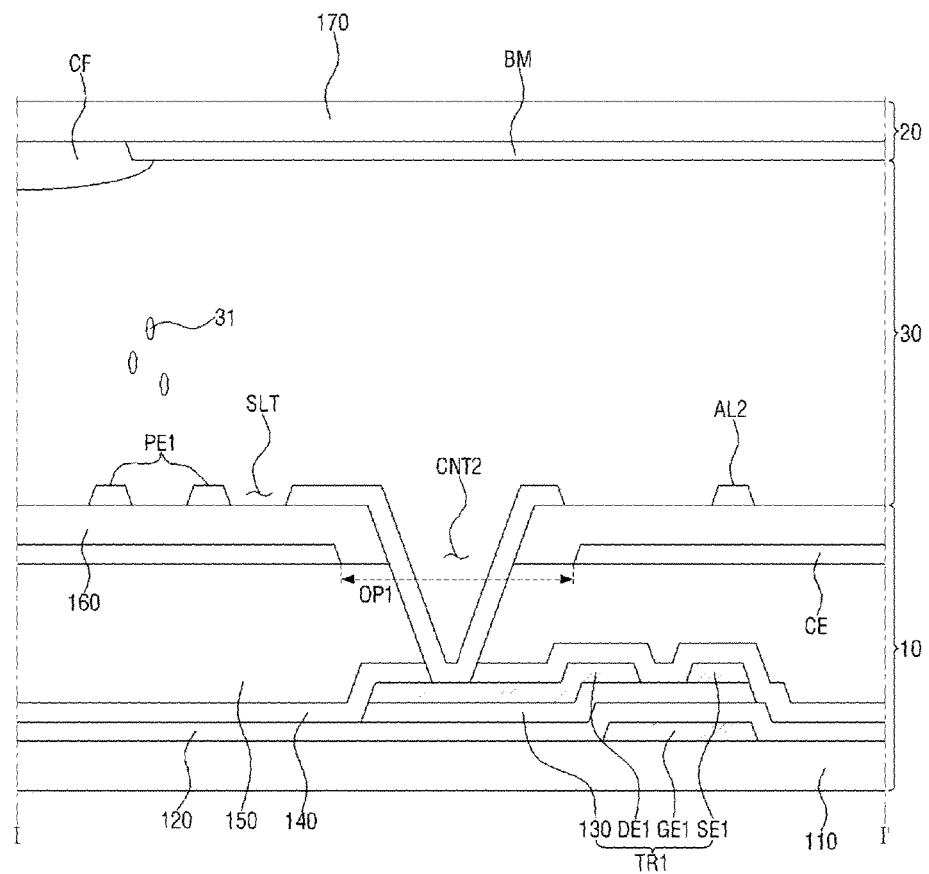
FIG. 6 is a cross-sectional view taken along line I-I' indicated in FIG. 4 according to an embodiment.
Figure 7:
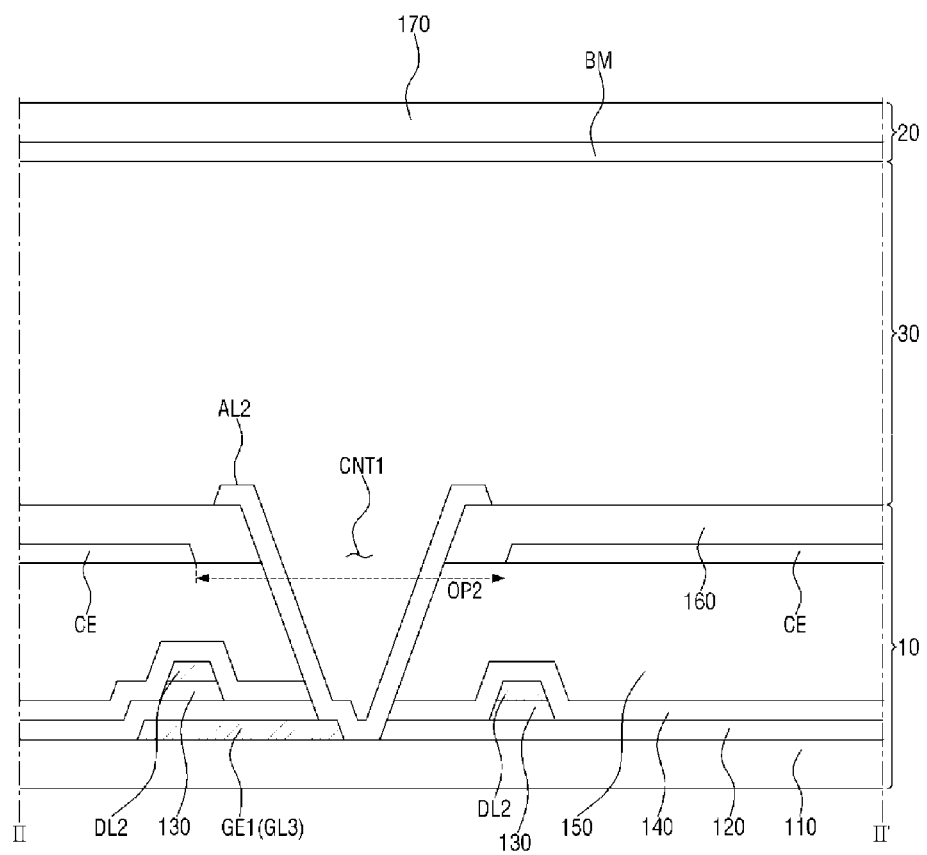
FIG. 7 is a cross-sectional view taken along line II-II' indicated in FIG. 4 according to an embodiment.

FIG. 4 is a schematic plan view illustrating a first pixel unit of the display panel 100 illustrated in FIG. 2 according to an embodiment. FIG. 5 is a schematic view illustrating a cross-section of the first pixel unit illustrated in FIG. 4 according to an embodiment. FIG. 6 is a cross-sectional view taken along line I-I' indicated in FIG. 4 according to an embodiment. FIG. 7 is a cross-sectional view taken along line II-II' indicated in FIG. 4 indicated in. The layout and the cross-sectional structure of the display panel 100 are described using the first pixel unit PX1 as an example.

Referring to FIGS. 4 through 7, the LCD device according to the present embodiment may include a lower display panel 10, an upper display panel 20, and a liquid crystal layer 30, which is interposed between the lower display panel 10 and the upper display panel 20. The lower display panel 10 is disposed to face the upper display panel 20. The lower display panel 10 may be bonded to the upper display panel 20 through, for example, sealing.

The lower display panel 10 will hereinafter be described.

A lower substrate 110 may be, for example, a transparent glass substrate or a plastic substrate, and may be an array substrate on which a plurality of switching devices are disposed.

The third gate line GL3 and a first gate electrode GE1 may be disposed on the lower substrate 110. The third gate line G13 may extend in the second direction d2 and may be disposed on the lower substrate 110. The first gate electrode GE1 may extend from the third gate line GL3 in the third direction d3.

The third gate line GL3 and the first gate electrode GE1 may be formed as a single layer of one conductive metal selected from among aluminum (Al), copper (Cu), molybdenum (Mo), chromium (Cr), titanium (Ti), tungsten (W), molybdenum tungsten (MoW), molybdenum titanium (MoTi), and copper (Cu)/MoTi or as a double or triple layer of at least two conductive metals selected from among Al, Cu, Mo, Cr, Ti, W, MoW, MoTi, and Cu/MoTi.

The gate insulating layer 120 may be disposed on the third gate line GL3 and the first gate electrode GE1. The gate insulating layer 120 may be formed of, for example, silicon nitride (SiNx) or silicon oxide (SiOx). The gate insulating layer 120 may have a multilayer structure including at least two insulating layers having different physical properties from each other.

A semiconductor layer 130 may be disposed on the gate insulating layer 120. The semiconductor layer 130 may be formed of amorphous silicon or polycrystalline silicon. Alternatively, the semiconductor layer 130 may be formed of at least one oxide semiconductor selected from among indium gallium zinc oxide (IGZO), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. If the semiconductor layer 130 is formed of amorphous silicon or polycrystalline silicon, an ohmic contact layer may be disposed between the semiconductor layer 130 and a data conductor DW (of FIG. 5).

The data conductor DW may be disposed on the semiconductor layer 130 to at least partially overlap the semiconductor layer 130. The data conductor DW may include the second data line DL2, a first source electrode SE1, and a first drain electrode DE1. Accordingly, the second data line DL2, the first source electrode SE1, and the first drain electrode DE1 may be disposed on the same layer. In a case in which the data conductor DW and the semiconductor layer 130 are formed together by a single mask process, the semiconductor layer 130 may be disposed below the data conductor DW. That is, the semiconductor layer 130 may have substantially the same shape as the data conductor DW in the entire area except for a channel region.

The data conductor DW may be formed as a single layer of one conductive metal selected from among Al, Cu, Mo, Cr, Ti, W, MoW, MoTi, and Cu/MoTi or as a double or triple layer of at least two conductive metals selected from among Al, Cu, Mo, Cr, Ti, W, MoW, MoTi, and Cu/MoTi, but embodiments are not limited thereto. That is, the data conductor DW may be formed of various metals or conductors.

The first source electrode SE1 may be connected to the second data line DL2. The first drain electrode DE1 may be disposed on the semiconductor layer 130 and may be at a predetermined distance from the first source electrode SE1. The first drain electrode DE1 may be at least partially exposed, and may be electrically connected to the first pixel electrode PE1 via a second contact hole CNT2.

A first passivation layer 140 may be disposed on the data conductor DW, including the first source electrode SE1, the first drain electrode DE1, and the second data line DL2, and the gate insulating layer 120. The first passivation layer 140 may be formed of an inorganic insulating material such as silicon nitride or silicon oxide.

An organic insulating layer 150 may be disposed on the first passivation layer 140 and may at least partially expose the first drain electrode DE1. The organic insulating layer 150 may comprise a photosensitive material. The display device according to the present embodiment is illustrated as including the organic insulating layer 150, but the organic insulating layer 150 may not be provided. In a case in which the organic insulating layer 150 is not provided, the common electrode CE may be disposed directly on the first passivation layer 140.

The common electrode CE may be disposed on the organic insulating layer 150. The common electrode CE may at least partially overlap the first pixel electrode PE1. The common electrode CE may form an electric field with the first pixel electrode PE1 and may adjust the alignment direction of a plurality of liquid crystal molecules 31, which are interposed between the lower display panel 10 and the upper display panel 20. The common electrode CE may be formed of a transparent conductive material such as indium tin oxide (ITO) or indium zinc oxide (IZO). The common electrode CE may be provided as a plate. Alternatively, the common electrode CE may include slits.

The common electrode CE may include a first opening OP1 and a second opening OP2. The first opening OP1 of the common electrode CE is for preventing a short circuit with the first pixel electrode PE1, which is electrically connected to the first drain electrode DE1. The second opening OP2 of the common electrode CE is for preventing a short circuit with the second auxiliary line AL2, which is electrically connected to the third gate line GL3. The size and shape of the first and second openings OP1 and OP2 are not particularly limited to those illustrated in FIGS. 4 through 7 as long as the first and second openings OP1 and OP2 can prevent short circuits with the first pixel electrode PE1 and the second auxiliary line AL2. Only the first and second openings OP1 and OP2 of the common electrode CE have been mentioned above, but the common electrode CE may also include a plurality of openings for preventing short circuits with other pixel electrodes or the other auxiliary lines (i.e., the first and third through m-th auxiliary lines AL1 and AL3 through ALm).

The common electrode CE may be electrically connected to the first common electrode line CL1 that has been described above with reference to FIG. 2 and may thus reduce a ripple component of the common voltage Vcom.

The second passivation layer 160 may be disposed on the common electrode CE. The second passivation layer 160 may be formed of an inorganic insulating material such as silicon nitride or silicon oxide.

The first pixel electrode PE1 may be disposed on the second passivation layer 160. The first pixel electrode PE1 may be formed of a transparent conductive material such as ITO or IZO. The first pixel electrode PE1 may be disposed to at least partially overlap the common electrode CE. That is, the first pixel electrode PE1 may at least partially overlap the common electrode CE in a vertical direction with respect to the lower substrate 110 and may thus form a horizontal field.

The first pixel electrode PE1 and the common electrode CE may be insulated from each other by the second passivation layer 160. The first pixel electrode PE1 may be electrically connected to the first drain electrode DE1 of the first switching device TR1 via the second contact hole CNT2. The first pixel electrode PE1 may include a plurality of slits SLT. The slits SLT may form a fringe field between the first pixel electrode PE1 and the common electrode CE and may thus help the liquid crystal molecules 31 rotate in a particular direction.

The first pixel electrode PE1 has been described above as being disposed on the common electrode CE1, but embodiments are not limited thereto. That is, the common electrode CE may be disposed on the first pixel electrode PE1. In this case, the common electrode CE may include a plurality of slits.

The second auxiliary line AL2 may be disposed on the second passivation layer 160. A top flat side of the second passivation layer 160 may directly contact both the second auxiliary line AL2 and the first pixel electrode PE1. That is, the second auxiliary line AL2 may be disposed on the same layer as the first pixel electrode PE1. The second auxiliary line AL2 and the first pixel electrode PE1 may be spaced from each other and may thus be electrically insulated from each other. The second auxiliary line AL2 may extend in the same direction as the second data line DL2 and may be disposed on a different layer from the second data line DL2 to overlap the second data line DL2. The width of the second auxiliary line AL2 may be identical to, or different from, the width of the second data line DL2.

The second auxiliary line AL2 may be formed as a single layer of one conductive metal selected from among Al, Cu, Mo, Cr, Ti, W, MoW, MoTi, and Cu/MoTi or as a double or triple layer of at least two conductive metals selected from among Al, Cu, Mo, Cr, Ti, W, MoW, MoTi, and Cu/MoTi, but embodiments are not limited thereto. That is, the second auxiliary line AL2 may be formed of various metals or conductors.

The second auxiliary line AL2 may be electrically connected to the third gate line GL3 via the first contact hole CNT1. The size and location of the first contact hole CNT1 are not particularly limited to those illustrated in FIGS. 4 through 6 as long as the first contact hole CNT1 can electrically connect the second auxiliary line AL2 and the third gate line GL3. The second auxiliary line AL2 may be connected to one of the integrated drivers 200 of FIG. 1 and may provide a gate signal received from the corresponding integrated driver 200 to the third gate line GL3.

Since the second auxiliary line AL2 may be disposed on the same layer as the first pixel electrode PE1, the distance between the second auxiliary line AL2 and the third gate line GL3 in the vertical direction with respect to the lower substrate 110 may be lengthened. As a result, signal interference between the second auxiliary line AL2 and the third gate line GL3 may be prevented.

Although not specifically illustrated, an alignment layer (not illustrated) may be disposed on the first pixel electrode PE1 and the second auxiliary line AL2. The alignment layer may be formed of, for example, polyimide.

The upper display panel 20 will hereinafter be described.

An upper substrate 170 may be disposed to face the lower substrate 110. The upper substrate 170 may be formed of a transparent glass or plastic material. For example, the upper substrate 170 may be formed of the same material as the lower substrate 110.

A black matrix BM, which blocks the transmission of light, may be disposed on the upper substrate 170 in an entire area except for a pixel area. For example, the black matrix BM may be formed of an organic material or a metal material including Cr.

A color filter CF may be disposed on the black matrix BM and the upper substrate 170. More specifically, the color filter CF may be formed on the upper substrate 170 in the pixel area defined by the black matrix BM. For example, the color filter CF may display one of red, green, and blue.

The color filter CF has been described above as being provided in the upper display panel 20, but embodiments are not limited thereto. That is, the color filter CF may be provided in the lower display panel 10.

Although not specifically illustrated, an overcoat layer (not illustrated) and an alignment layer (not illustrated) may be disposed on the upper substrate 170. The overcoat layer may cover and planarize the color filter CF and the black matrix BM.

Figure 8:
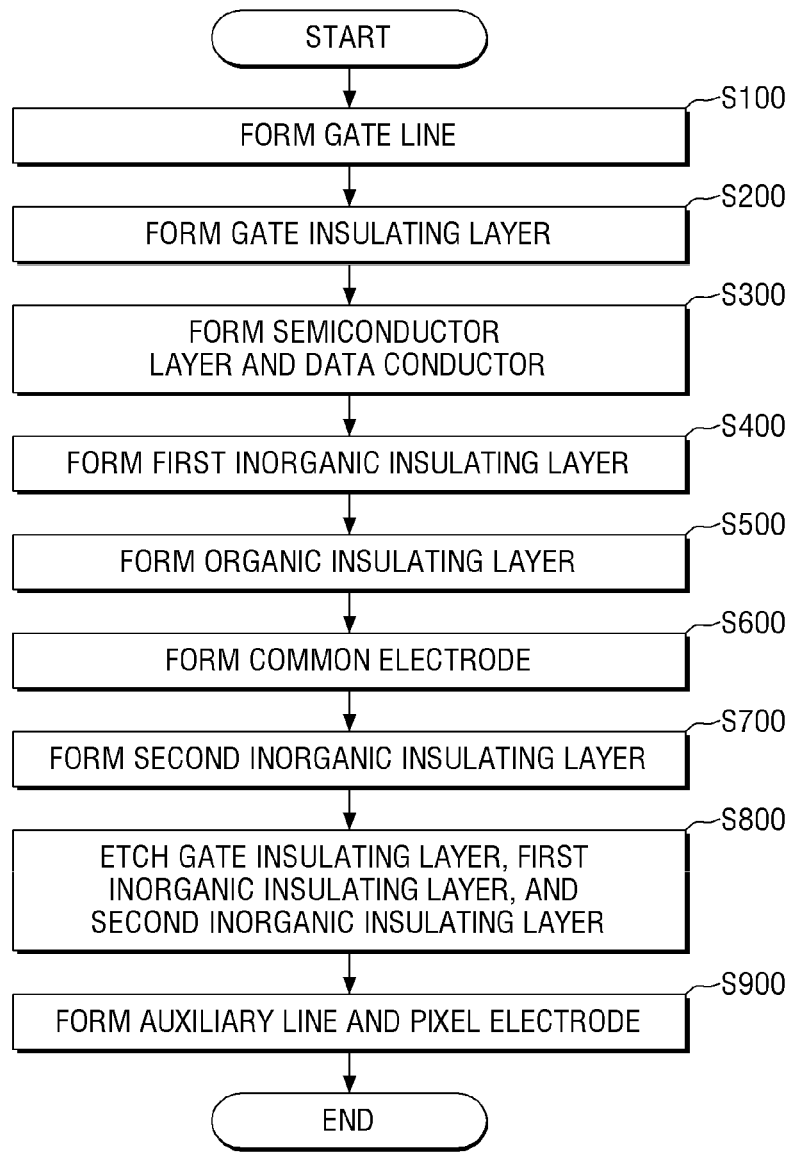
FIG. 8 is a flowchart illustrating a method of manufacturing a display device, such as an LCD device, according to an embodiment of the present disclosure.

FIG. 8 is a flowchart illustrating a method of manufacturing a display device, such as an LCD device, according to an embodiment. FIG. 9, FIG. 10, FIG. 11, FIG. 12, and FIG. 13 are schematic cross-sectional views illustrating elements and/or structures formed in the method of manufacturing a display device, such as an LCD device, according to an embodiment. The method of manufacturing an LCD device, according to an embodiment, will hereinafter be described using the first pixel unit PX1 as an example.

Figure 9:
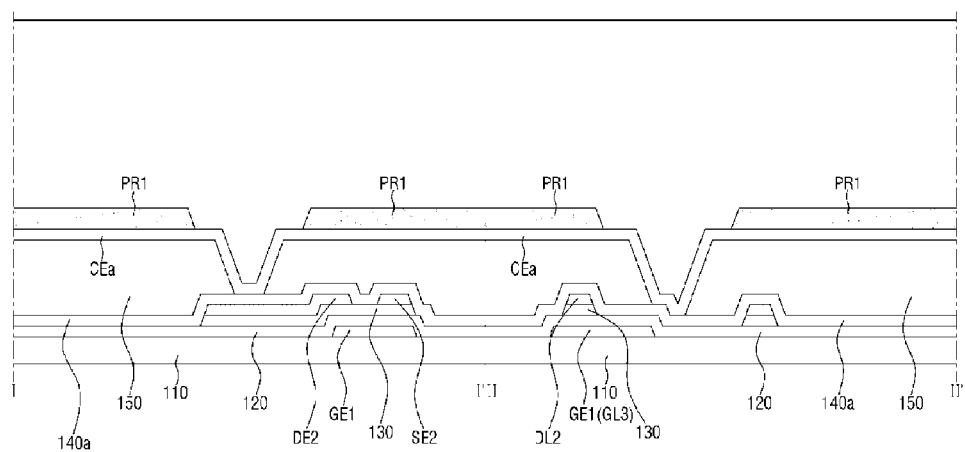
FIG. 9, FIG. 10, FIG. 11, FIG. 12, and FIG. 13 are schematic cross-sectional views illustrating elements and/or structures formed in a method of manufacturing a display device, such an LCD device, according to an embodiment.

Referring to FIGS. 4, 8, and 9, the third gate line GL3 and the first gate electrode GE1 are formed on the lower substrate 110 (in a process S100). More specifically, a gate conductive layer is formed first on the lower substrate 110, and the gate conductive layer is etched, using a photosensitive layer pattern as a mask, thereby forming the first gate electrode GE and the third gate line GL3. The gate conductive layer may be formed as a single layer of one conductive metal selected from among Al, Cu, Mo, Cr, Ti, W, MoW, MoTi, and Cu/MoTi or as a double or triple layer of at least two conductive metals selected from among Al, Cu, Mo, Cr, Ti, W, MoW, MoTi, and Cu/MoTi, but embodiments are not limited thereto. That is, the gate conductive layer may be formed of one or more of various metals or conductors.

Thereafter, the photosensitive layer pattern is removed, and the gate insulating layer 120 is formed on the first gate electrode GE1 and the third gate line GL3 (in a process S200). The gate insulating layer 120 may be formed by chemical vapor deposition (CVD). The gate insulating layer 120 may be formed on the entire surface of the lower substrate 110 where the third gate line GL3 is formed.

Thereafter, a semiconductor pattern (not illustrated) and a first conductive material layer (not illustrated) are sequentially deposited on the gate insulating layer 120. The semiconductor pattern may be formed by depositing, for example, amorphous silicon or polycrystalline silicon through CVD. Alternatively, as already mentioned above, the semiconductor pattern may be formed of an oxide semiconductor. The first conductive material layer may be formed a single layer of one conductive metal selected from among Al, Cu, Mo, Cr, Ti, W, MoW, MoTi, and Cu/MoTi or as a double or triple layer of at least two conductive metals selected from among Al, Cu, Mo, Cr, Ti, W, MoW, MoTi, and Cu/MoTi, but embodiments are not limited thereto.

A photosensitive layer pattern is applied onto the first conductive material layer, and a mask process is performed using a halftone mask or a slit mask. As a result, the semiconductor pattern is etched into the semiconductor layer 130, and the first conductive material layer is etched into the data conductor DW (in a process S300).

That is, the semiconductor layer 130 and the data conductor DW may be formed by the same mask process. Accordingly, the semiconductor layer 130 may remain below the data conductor DW.

The data conductor DW may include the second data line DL2, the first source electrode SE1, and the first drain electrode DE1. As a result of the mask process, the first switching device TR1, including the first gate electrode GE1, the semiconductor layer 130, the first source electrode SE1, and the first drain electrode DE1, may be formed.

The formation of a first inorganic material layer 140a and the organic insulating layer 150 will hereinafter be described. The first inorganic insulating layer 140a may be formed on the semiconductor layer 130, the second data line DL2, the first source electrode SE1, and the first drain electrode DE1 (in a process S400). For example, the first inorganic insulating layer 140a may be formed of an inorganic insulating material such as silicon nitride or silicon oxide.

Thereafter, an organic insulating layer (not illustrated) may be formed on the first inorganic insulating layer 140a. The organic insulating layer may comprise, for example, an organic material including a photosensitive material. In a case in which the organic insulating layer comprises a photosensitive material, the organic insulating layer 150, which includes contact holes CNT, may be formed (in a process S500) by performing exposure and development processes using an optical mask.

Thereafter, a second conductive material layer CEa may be formed before the etching of the first inorganic insulating layer 140a. The second conductive material layer CEa may be formed of a transparent conductive material such as ITO or IZO. Thereafter, a first photosensitive layer pattern PR1 is formed by applying a photosensitive layer onto the second conductive material layer CEa and performing exposure and development using a halftone mask or a slit mask.

Figure 10:
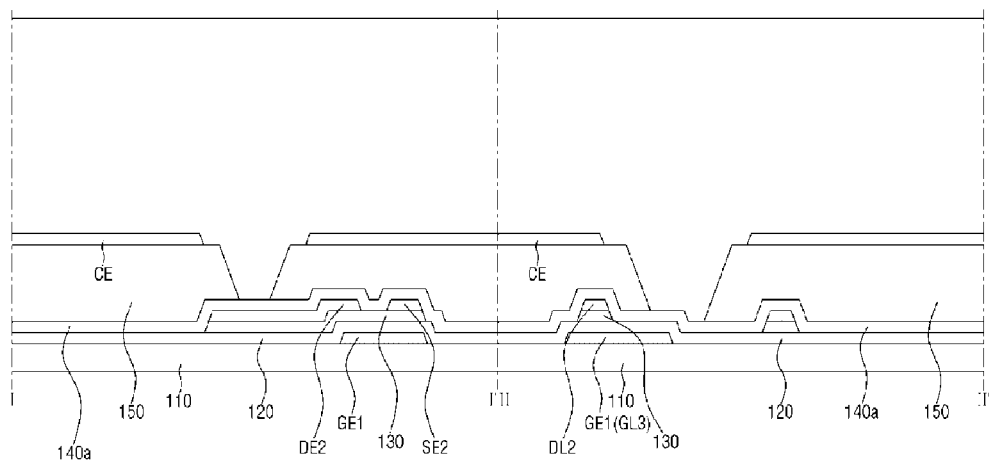

Referring to FIG. 10, the common electrode CE may be formed (in a process S600) by etching away part of the second conductive material layer CEa that is exposed using the first photosensitive layer pattern PR1 as a mask. The common electrode CE may include the first opening OP1, which is for preventing a short circuit with the first pixel electrode PE, and the second opening OP2, which is for preventing a short circuit with the second auxiliary line AL2.

Figure 11:
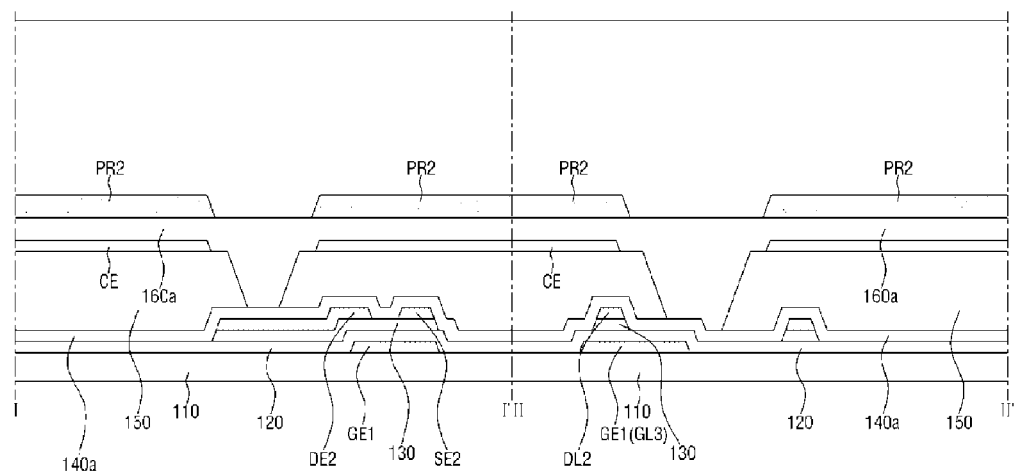

Referring to FIG. 11, a second inorganic insulating layer 160a may be formed on the common electrode CE (in a process S700). The second inorganic insulating layer 160a may be formed of an inorganic insulating material such as silicon nitride or silicon oxide, or organic insulating material. Thereafter, a second photosensitive layer pattern PR2 may be formed by applying a photosensitive layer onto the second inorganic insulating layer 160a and performing exposure and development using a halftone mask or a slit mask.

Figure 12:
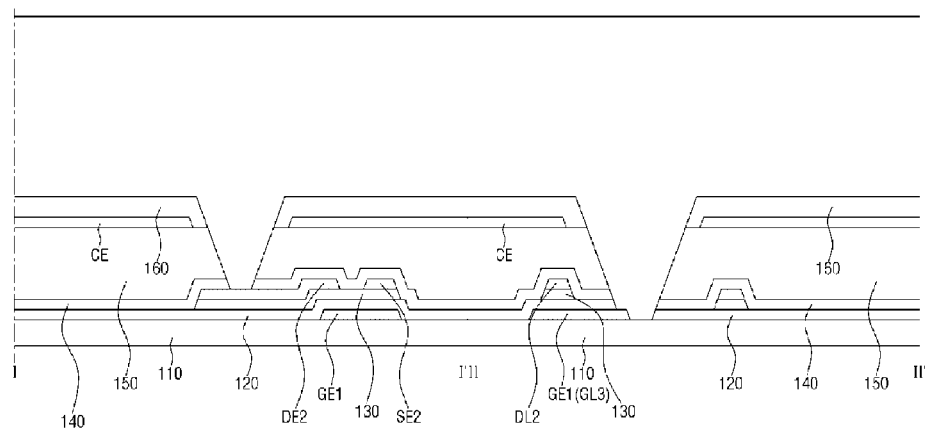

Referring to FIG. 12, the second passivation layer 160 may be formed by etching away part of the second inorganic insulating layer 160a that is exposed, using the second photosensitive layer pattern PR2 as a mask. Thereafter, the first passivation layer 150, which exposes part of the first drain electrode DE1, may be formed by etching away part of the first inorganic insulating layer 140a that is exposed due to the second inorganic insulating layer 160a being etched, using the second photosensitive layer pattern PR2 as a mask. Thereafter, part of the third gate line GL3 may be exposed by etching away part of the gate insulating layer 120 that is exposed due to the first inorganic insulating layer 140a being etched, using the second photosensitive layer pattern PR2 as a mask. That is, by using the second photosensitive layer pattern PR2 as a mask, the second inorganic insulating layer 160a, the first inorganic insulating layer 150a, and the gate insulating layer 120 may be sequentially etched (in a process S800) using the second photosensitive layer pattern PR2 as a mask.

Figure 13:
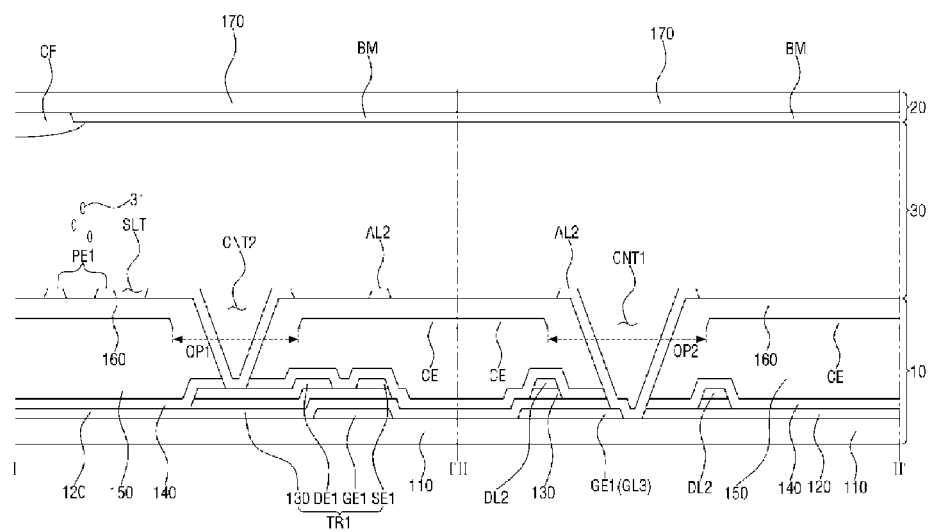

Thereafter, referring to FIG. 13, a third conductive material layer (not illustrated) may be formed on the second passivation layer 160. The third conductive material layer may comprise one selected from the transparent material group consisting of ITO and IZO. Thereafter, the first pixel electrode PE1, which at least partially overlaps the common electrode CE and is electrically connected to the first drain electrode DE1 that is exposed, may be formed by selectively etching the third conductive material layer through a mask process.

A fourth conductive material layer (not illustrated) may be formed on the second passivation layer 160. The fourth conductive material layer may be disposed on the same layer as the first pixel electrode PE1. The fourth conductive material layer may be formed as a single layer of one conductive metal selected from among Al, Cu, Mo, Cr, Ti, W, MoW, MoTi, and Cu/MoTi or as a double or triple layer of at least two conductive metals selected from among Al, Cu, Mo, Cr, Ti, W, MoW, MoTi, and Cu/MoTi. Thereafter, the second auxiliary line AL2, which extends to overlap the second data line DL2 and is electrically connected to the third gate line GL3, may be formed by selectively etching the fourth conductive material layer.

Accordingly, the second auxiliary line AL2 and the first pixel electrode PE1 may be formed on the second passivation layer 160 (in a process S900).

It has been described that the first pixel electrode PE1 is formed first and then the second auxiliary line AL2 is formed, but embodiments are not limited thereto.

Although example embodiments have been described herein, many other embodiments are practical. Possible embodiments are not limited to the described embodiments, but include various modifications and arrangements.

What is claimed is:

1. A liquid crystal display (LCD) device, comprising:
a substrate;
a first gate line disposed on the substrate;
a data line disposed on the first gate line and insulated from the first gate line;
an auxiliary line extending over the data line in the same direction as the data line and overlapping the data line;
a first switching device including a first electrode, which is electrically connected to the first gate line, a second electrode, which is electrically connected to the data line, and a third electrode, which is disposed on the same layer as the data line and is spaced from the second electrode; and
a first pixel electrode, which is electrically connected to the third electrode of the first switching device,
wherein the auxiliary line is disposed on the same layer as the first pixel electrode and is electrically connected to the first gate line.

2. The LCD device of claim 1, further comprising:
a first contact hole exposing at least part of the first gate line,
wherein the at least part of the first gate line is electrically connected to the auxiliary line via the first contact hole.

3. The LCD device of claim 1, further comprising:
a second contact hole exposing at least part of the third electrode of the first switching device,
wherein the at least part of the third electrode is electrically connected to the first pixel electrode via the second contact hole.

4. The LCD device of claim 1, further comprising:
a second gate line disposed on the same layer as the first gate line and extending over the substrate in the same direction as the first gate line;
a second switching device electrically connected to the second gate line and the data line; and
a second pixel electrode electrically connected to the second switching device,
wherein the first pixel electrode is disposed on one side of the data line and the second pixel electrode is disposed on the other side of the data line.

5. The LCD device of claim 4, wherein the first and second gate lines are disposed between the first and second pixel electrodes.

6. The LCD device of claim 1, further comprising:
a first insulating layer disposed between the first gate line and the data line;
a second insulating layer disposed on the second and third electrodes of the first switching device;
a common electrode disposed on the second insulating layer; and
a third insulating layer disposed on the common electrode,
wherein the auxiliary line and the first pixel electrode are disposed on the third insulating layer.

7. The LCD device of claim 6, further comprising:
an organic insulating layer disposed between the second and third insulating layers.

8. The LCD device of claim 1, wherein the auxiliary line crosses the first gate line in a plan view of the display device.

9. The LCD device of claim 1, wherein the auxiliary line extends parallel to the first data line.

10. The LCD device of claim 1, wherein the substrate includes a display area in which the first switching device and the first pixel electrode are disposed and a non-display area which is disposed outside the display area, and the LCD device further comprises an integrated driver disposed in the non-display area of the substrate and connected to the data line and the auxiliary line.

11. A liquid crystal display (LCD) device, comprising:
a display panel;
an integrated driver disposed on one side of the display panel and electrically connected to a data line, which extends in a first direction, and an auxiliary line, which overlaps the data line; and
a first gate line extending in a second direction, which is different from the first direction, and electrically connected to the auxiliary line; and
a second gate line extending in the second direction and electrically connected to the auxiliary line,
wherein the display panel includes a first pixel unit, which includes a first switching device electrically connected to the first gate line and the data line and includes a first pixel electrode electrically connected to the first switching device, wherein the display panel further includes a second pixel unit, which includes a second switching device electrically connected to the second gate line and the data line and includes a second pixel electrode electrically connected to the second switching device, and the auxiliary line is disposed on the same layer as the first pixel electrode.

12. The LCD device of claim 11,
wherein the first pixel electrode is disposed on one side of the data line, and the second pixel electrode is disposed on the other side of the data line.

13. The LCD device of claim 12, wherein the first and second gate lines are disposed between the first and second pixel electrodes.

14. The LCD device of claim 12, further comprising:
a third gate line adjacent to the first gate line in a third direction, which is opposite to the first direction; and
a fourth gate line adjacent to the second gate line in the first direction,
wherein the display panel includes a third pixel unit, which includes a third switching device electrically connected to the third gate line and the data line and a third pixel electrode electrically connected to the third switching device, and a fourth pixel unit, which includes a fourth switching device electrically connected to the fourth gate line and the data line and a fourth pixel electrode electrically connected to the fourth switching device.

15. The LCD device of claim 14, wherein the auxiliary line crosses the first gate line in a plan view of the display device.

16. A method of manufacturing a liquid crystal display (LCD) device, the method comprising:
preparing a substrate having a gate line covered by a gate insulating layer;
forming a data line on the gate insulating layer;
forming a first inorganic insulating layer on the data line;
forming an organic insulating layer on the first inorganic insulating layer;
forming a common electrode on the organic insulating layer;
forming a second inorganic insulating layer on the common electrode;
forming a second passivation layer, a first passivation layer, and a gate insulating layer, which partially exposes the gate line, by etching the second inorganic insulating layer, the first inorganic insulating layer, and the gate insulating layer;
forming a pixel electrode, which at least partially overlaps the common electrode and is disposed on the second passivation layer; and
forming an auxiliary line, which is electrically connected to at least part of the partially-exposed gate line, on the second passivation layer,
wherein the auxiliary line overlaps the data line, the pixel electrode is disposed on the same layer as the auxiliary line, the data line and the auxiliary line extend in a first direction, and the gate line extends in a second direction, which is different from the first direction.

17. The method of claim 16, wherein the second inorganic insulating layer, the first inorganic insulating layer, and the gate insulating layer are etched using the same mask pattern.

18. The method of claim 16, wherein the auxiliary line crosses the gate line in a plan view of the display device.

* * * * *